US009563774B1

United States Patent
Litvin

(10) Patent No.: US 9,563,774 B1
(45) Date of Patent: Feb. 7, 2017

(54) APPARATUS AND METHOD FOR SECURELY LOGGING BOOT-TAMPERING ACTIONS

(71) Applicant: Juniper Networks, Inc., Sunnyvale, CA (US)

(72) Inventor: Moshe Litvin, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 14/868,331

(22) Filed: Sep. 28, 2015

Related U.S. Application Data

(63) Continuation of application No. 14/221,253, filed on Mar. 20, 2014, now Pat. No. 9,147,075.

(51) Int. Cl.
| | | |
|---|---|---|
| *G06F 21/12* | (2013.01) | |
| *G06F 21/57* | (2013.01) | |
| *H04L 29/06* | (2006.01) | |
| *G06F 21/55* | (2013.01) | |
| *H04L 9/32* | (2006.01) | |

(52) U.S. Cl.
CPC ........... *G06F 21/575* (2013.01); *G06F 21/552* (2013.01); *H04L 9/3247* (2013.01); *H04L 63/0435* (2013.01); *H04L 63/06* (2013.01); *H04L 63/0823* (2013.01); *G06F 2221/034* (2013.01)

(58) Field of Classification Search
CPC .............................. G06F 21/575; G06F 9/4416
USPC .... 713/153, 155, 176, 183, 188; 726/2, 5, 7, 726/12
See application file for complete search history.

(56) References Cited

U.S. PATENT DOCUMENTS

| | | | |
|---|---|---|---|
| 6,560,706 B1* | 5/2003 | Carbajal ............... | G06F 21/572 713/155 |
| 9,064,118 B1* | 6/2015 | Reinauer ............... | G06F 21/575 |
| 2005/0125407 A1* | 6/2005 | Kraus ................... | G06F 21/575 |
| 2005/0132357 A1* | 6/2005 | Shell ..................... | G06F 21/121 717/174 |
| 2007/0192581 A1* | 8/2007 | Challener ............. | G06F 9/4408 713/2 |
| 2009/0320110 A1 | 12/2009 | Nicolson et al. | |
| 2011/0302400 A1 | 12/2011 | Maino et al. | |
| 2012/0060030 A1* | 3/2012 | Lamb .................. | H04L 63/0876 713/166 |
| 2012/0096513 A1 | 4/2012 | Raleigh et al. | |
| 2012/0110644 A1* | 5/2012 | Thom ..................... | G06F 21/57 726/4 |
| 2013/0346757 A1 | 12/2013 | Nick et al. | |

OTHER PUBLICATIONS

"BIOS and Secure Boot Attacks Uncovered"—Furtak et al, Intel, Jun. 2012 http://www.intelsecurity.com/resources/pr-bios-secure-boot-attacks-uncovered.pdf.*

* cited by examiner

*Primary Examiner* — Randy Scott
(74) *Attorney, Agent, or Firm* — Fisher Broyles, LLP

(57) ABSTRACT

The disclosed apparatus may include a storage device and a secure counter. The apparatus may also include a tamper-logging component that (1) detects an action that is associated with booting untrusted images from the storage device and, in response to detecting the action, (2) securely logs the action by incrementing the secure counter. Various other apparatuses, systems, and methods are also disclosed.

16 Claims, 6 Drawing Sheets

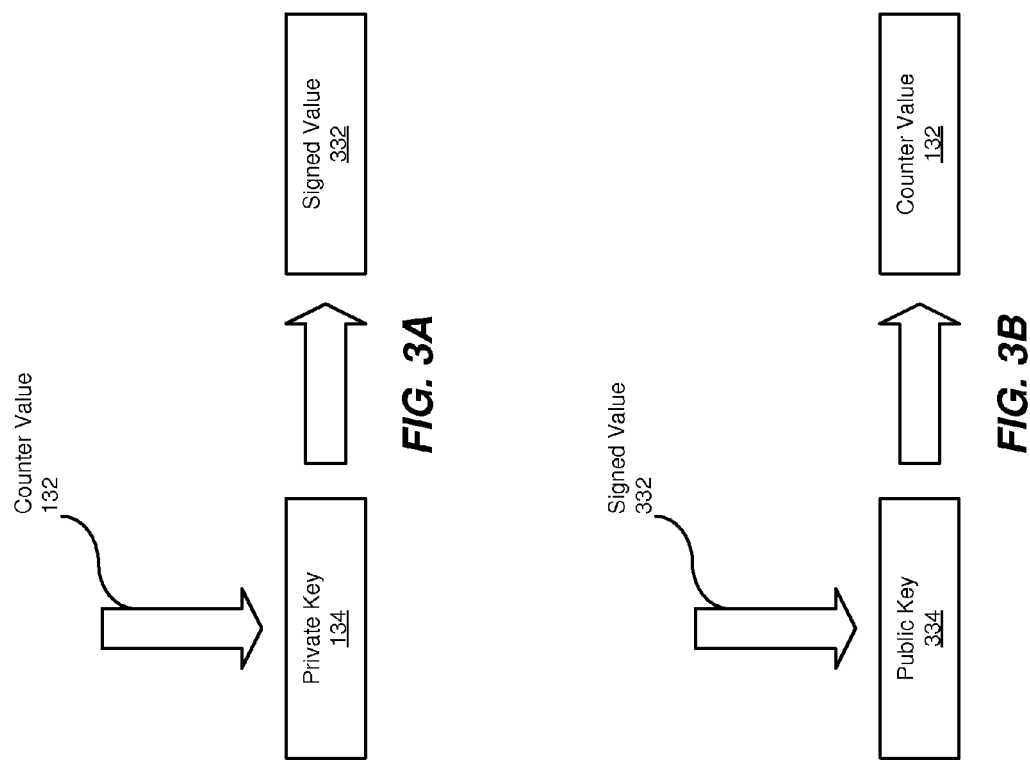

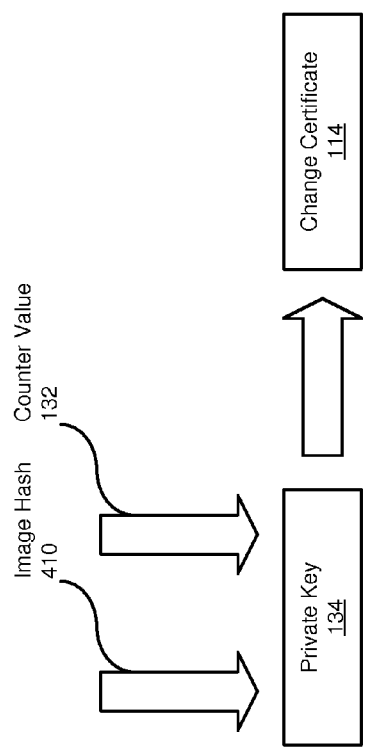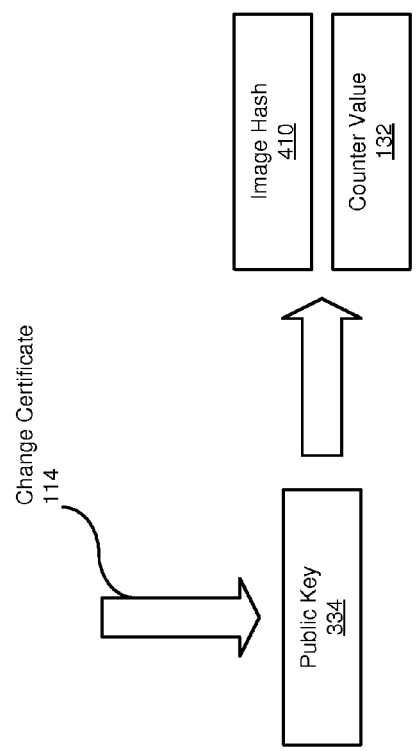
FIG. 4A
FIG. 4B

APPARATUS AND METHOD FOR SECURELY LOGGING BOOT-TAMPERING ACTIONS

CROSS REFERENCE TO RELATED APPLICATION

This application is a continuation of U.S. application Ser. No. 14/221,253 filed 20 Mar. 2014, the disclosure of which is incorporated, in its entirety, by this reference.

BACKGROUND

In recent years, enterprises and consumers have become increasingly aware of, and concerned about, the state of security of their computing devices and systems. These concerns have been magnified in view of reports of government agencies installing backdoor components that allow surreptitious access onto computing devices after the devices have left their manufacturers. In view of these and other concerns, device manufacturers may wish to provide some form of guarantee or assurance to their customers that the computing devices they sell are secure. For example, a manufacturer may attempt to secure its devices by limiting the same (using, e.g., various software and/or hardware-based security components) to only booting images and/or executing applications that have been digitally signed by the manufacturer.

However, to ensure industry compatibility and/or to reduce development costs, manufacturers often incorporate various free or open-source software components (including operating systems, such as LINUX and FREEBSD) into their devices. Unfortunately, free or open-source software components are often governed by software licenses (such as the GNU GENERAL PUBLIC LICENSE (GPL)) that require that manufacturers allow end users to freely replace or otherwise modify the software components governed by these licenses. This requirement is often at odds with a manufacturer's desire to secure devices that run software governed by these types of licenses, effectively precluding the manufacturer from limiting its devices to only booting images and/or executing applications that have been digitally signed by the manufacturer. The present document, therefore, identifies and addresses a need for improved systems and methods for securing devices that must comply with the restrictions of free or open-source software licenses.

SUMMARY

As will be described in greater detail below, the present disclosure describes various apparatuses and methods for securely logging and accurately reflecting the state of security of computing devices that must comply with the restrictions of free or open-source software licenses. In one example, an apparatus for accomplishing such a task may include a storage device and a secure counter. The apparatus may also include a tamper-logging component that detects an action that is associated with booting untrusted images from the storage device and, in response to detecting the action, securely logs the action by incrementing the secure counter.

A corresponding method may include (1) detecting an action that is associated with booting untrusted images from a storage device of a computing device and, in response to detecting the action, (2) identifying a secure counter and (3) securely logging the action by incrementing the secure counter.

In one example, the above-described method may be encoded as computer-readable instructions on a non-transitory computer-readable medium. For example, a non-transitory computer-readable medium may include one or more computer-executable instructions that, when executed by at least one processor of a computing device, cause the computing device to detect an action that is associated with booting untrusted images from a storage device of the computing device. In response to detecting the action, the computer-executable instructions may cause the computing device to identify a secure counter and securely log the action by incrementing the secure counter.

Features from any of the above-mentioned examples may be used in combination with one another in accordance with the general principles described herein. These and other examples, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3A is a block diagram an of exemplary process for signing a secure counter's value.

FIG. 3B is a block diagram an of exemplary process for verifying the signed value of a secure counter.

FIG. 4A is a block diagram of an exemplary process for creating a change certificate that uniquely identifies a previously booted untrusted image.

FIG. 4B is a block diagram of an exemplary process for identifying a previously booted untrusted image from a change certificate.

Figure 1:
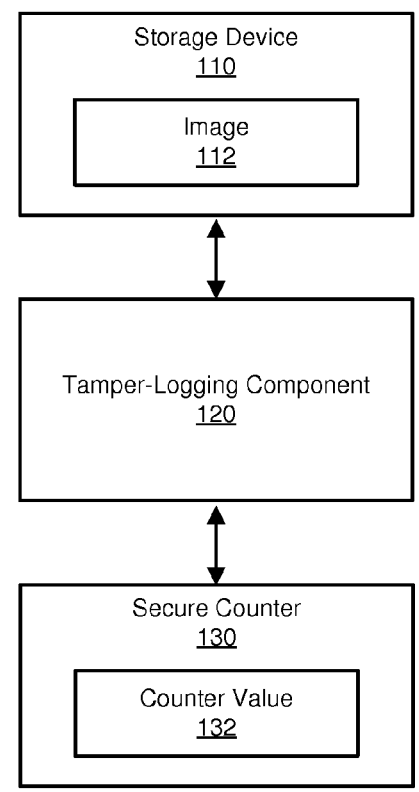
FIG. 1 is a block diagram of an exemplary apparatus that is capable of securely logging boot-tampering actions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses and methods for securely logging and accurately reflecting the state of security of computing devices that must comply with the restrictions of free or open-source software licenses. For example, by securely logging the occurrence of actions on a computing device that are associated with booting untrusted images (including, e.g., attempts to boot untrusted images and/or disable secure boot processes that prevent booting untrusted images), the apparatuses and methods described herein may securely record, and thus accurately reflect, the state of security of the computing device in question. This may in turn enable end users (or other entities or components) to verify the state of security of the computing device, including whether the computing device has ever booted an untrusted image or performed any other action that might compromise the state of security of the computing device.

Figure 2:
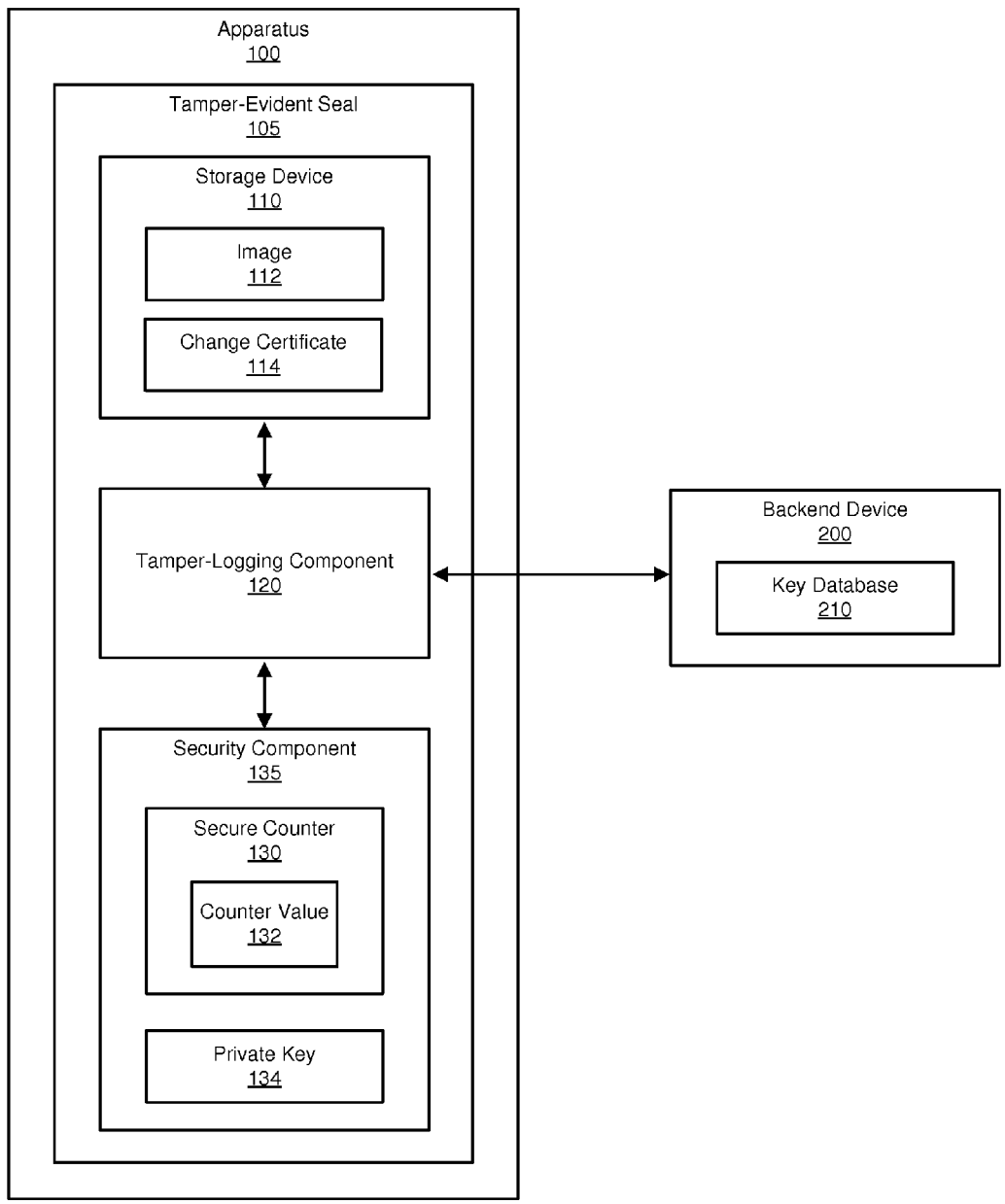
FIG. 2 is a block diagram of an additional exemplary apparatus that is capable of securely logging boot-tampering actions.

The following will provide, with reference to FIGS. 1-2, examples of apparatuses that are capable of securely logging boot-tampering actions. Detailed descriptions of corresponding computer-implemented methods and processes will also be provided in connection with FIGS. 3A-3B, 4A-4B, and 5. Finally, the discussion corresponding to FIG. 6 will provide numerous examples of systems that may include and/or incorporate the apparatuses illustrated in FIGS. 1-2.

FIG. 1 is a block diagram of an exemplary apparatus 100 capable of securely logging boot-tampering actions. As illustrated in this figure, apparatus 100 may include, in one basic configuration, a storage device 110, a tamper-logging component 120, and a secure counter 130.

The term "storage device," as used herein, generally refers to any type or form of medium capable of storing computer-readable information and/or instructions. Examples of storage devices include, without limitation, non-volatile storage devices (such as magnetic disk drives (e.g., so-called hard drives), solid state drives, magnetic tape drives, flash memory drives, optical disk drives, etc.), volatile storage devices (such as random access memory (RAM), removable storage devices (such as optical disks, flash memory drives, magnetic tape drives, etc.), and the like. In some examples, storage device 110 may be part of apparatus 100. In other examples, however, storage device 110 may represent, or form a portion of, a separate device accessed through a storage interface.

In some examples, storage device 110 may be configured to store one or more images, such as image 112 in FIG. 1. The term "image," as used herein, generally refers to any type or form of logical structure containing computer-readable information and/or instructions. In some examples, the term "image" may refer to all or a part of an operating system image (i.e., a logical structure that includes the instructions and/or information necessary to boot an operating system, such as a boot loader, operating system kernel, shared library, configuration file, etc.). In other examples, however, the term "image" may simply refer to a collection of computer-executable instructions, including application or system software.

As illustrated in FIG. 1, apparatus 100 may also include a tamper-logging component 120. The term "tamper-logging component," as used herein, generally refers to any type or form of software and/or hardware component (or combination of software and/or hardware components) capable of detecting and/or logging or otherwise recording (or causing to be securely logged or recorded) one or more computing actions. In one example, tamper-logging component 120 may represent a portion of a firmware component. Specifically, tamper-logging component 120 may represent a portion of, or be implemented within, a set of instructions for controlling basic input/control operations, such as a Basic Input/Output System (BIOS) or Unified Extensible Firmware Interface (UEFI), stored in persistent memory, such as a read only memory (ROM) device. In other examples, however, tamper-logging component 120 may represent, or be implemented within, a stand-alone or special-purpose module, component, or device.

In one example, and as will be described in greater detail below, tamper-logging component 120 may be configured to detect and/or log actions that are associated with booting untrusted images from storage device 110. The term "untrusted image," as used herein, generally refers to any image that fails to meet specific security or trustworthiness criteria, such as having been digitally signed by a particular entity, having been signed using a particular protocol, or the like. Examples of untrusted images include, without limitation, unsigned images, improperly signed images (e.g., images that have been signed by an unexpected entity or signed using an unexpected protocol), or the like.

In addition, the terms "booting" or "boot process," as used herein, generally refer to the initial set of operations that a computing device performs after electrical power is provided to the computing device's central processing unit ("CPU"). For example, a "boot process" may refer to a process that begins when a computing device is turned on or reset and ends when the computing device is ready to perform normal operations. In this example, the boot process may begin when a firmware component on the computing device (e.g., a ROM device containing a firmware interface such as BIOS or UEFI) completes its initial diagnostic routine (e.g., the power-on self test (POST)) and ends when a boot loader has loaded an operating system kernel from the computing device's storage device into memory.

Additionally, the phrase "action that is associated with booting untrusted images," as used herein, generally refers to any act or event that involves booting an untrusted image, directly or indirectly results in booting an untrusted image, and/or that otherwise allows, facilitates, or enables the booting of an untrusted image. Examples of such actions include, without limitation, disabling (either temporarily or permanently) a secure boot process that prevents booting untrusted images, booting an image (untrusted or otherwise) while a secure boot process is disabled, loading an untrusted image onto a computing device's storage device, failing a secure boot process due to booting an untrusted image (e.g., an unsigned or improperly signed image), tampering with or otherwise modifying various security components on a computing device that detect, log, and/or prevent booting untrusted images (such as resetting or otherwise attempting to change the counter value of a secure counter or the cryptographic key or state of a secure cryptoprocessor, as discussed in greater detail below), and/or any other action that may involve, enable, facilitate, and/or be associated with booting untrusted images.

As detailed above, in some examples apparatus 100 may implement (via, e.g., a firmware component) a secure boot process that prevents booting untrusted images. The term "secure boot process," as used herein, generally refers to a boot process that attempts to verify the integrity, authenticity, and/or legitimacy of one or more stages or parts of, and/or modules or components loaded during, the boot process. In one example, a "secure boot process" may refer to a boot process that requires that each stage or component of the boot process be properly signed. For example, upon completing its initial diagnostic routine (e.g., POST), a firmware interface (such as a BIOS or UEFI, which may, in this example, be implicitly trusted) may initiate a secure boot process by verifying that the next stage or component of the boot process (in this case, the boot loader) has been properly signed before loading the same into memory. Once the firmware interface verifies the authenticity of the boot loader's digital signature and loads the same into memory, the boot loader may in turn verify that the next stage or component of the boot process (in this case, the operating system kernel) has been properly signed before loading the same into memory. After the boot loader has verified the authenticity of the kernel's digital signature and loaded the same into memory, the kernel may in turn verify that one or more of the operating system's various components (e.g., executables, shared libraries, configuration files, etc.) have been properly signed before loading the same into memory. By proceeding in this manner, apparatus 100 may ensure that only trusted (i.e., properly signed) images and/or components are booted, executed, or loaded into memory.

As indicated above, tamper-logging component 120 may be configured to detect and log actions that are associated with booting untrusted images in order to record and accurately reflect the state of security of apparatus 100. Tamper-logging component 120 may detect actions that are associated with booting untrusted images in a variety of ways. For example, in embodiments where tamper-logging component 120 represents a portion of a firmware component (e.g., a ROM device containing a firmware interface such as BIOS or UEFI), tamper-logging component 120 may monitor and detect attempts to tamper with or otherwise modify the firmware component, including attempts to disable a secure boot process utilized by the firmware component. Similarly, tamper-logging component 120 may, as part of this firmware component, detect attempts to boot an image (untrusted or otherwise) while a secure boot process utilized by the firmware component is disabled and/or detect that a secure boot process utilized by the firmware component has failed due to booting an untrusted image (e.g., an unsigned or improperly signed image).

Tamper-logging component 120 may also monitor and detect attempts to tamper with or otherwise modify other components of apparatus 100, including storage device 110 and secure counter 130, as discussed in greater detail below. For example, tamper-logging component 120 may monitor for and detect attempts to (1) load an untrusted image onto storage device 110, (2) tamper with or otherwise modify various security components that detect, log, and/or prevent booting untrusted images (such as secure counter 130 and/or security component 135, as discussed in greater detail below), and/or (3) perform any other action that may involve, enable, facilitate, and/or be associated with booting untrusted images.

As detailed above, tamper-logging component 120 may, in response to detecting an action that is associated with booting an untrusted image, securely log (or cause to be securely logged) the detected action. The phrase "securely log," as used herein, generally refers to any act that tracks, documents, or otherwise records the occurrence of a computing event using techniques, protocols, and/or procedures that attempt to protect, safeguard, and/or preserve the integrity, validity, and/or authenticity of the same.

Tamper-logging component 120 may securely log actions associated with booting untrusted images in a variety of ways. In one example, tamper-logging component 120 may securely log such actions by incrementing a secure counter, such as secure counter 130 in FIG. 1. The phrase "secure counter," as used herein, generally refers to any type or form of software and/or hardware component that is capable of logging, recording, or otherwise tracking the occurrence of a computing action.

Secure counter 130 may log or record the occurrence of actions (such as actions associated with booting untrusted images) in a variety of ways. In one example, secure counter 130 may log or record the occurrence of an action associated with booting untrusted images by incrementing an internal counter value (e.g., counter value 132). In this example, the counter value 132 of secure counter 130 may represent the number of times actions associated with booting untrusted images have occurred. Secure counter 130 may also log or record the occurrence of actions using any other type or form of counting, notation, and/or recording technique.

For example, upon detecting an attempt to disable a secure boot process that prevents booting untrusted images (or upon detecting any other action that is associated with booting untrusted images), tamper-logging component 120 may increment (or cause to be incremented) the counter value 132 of secure counter 130. In this example, by querying secure counter 130 for its present value (i.e., counter value 132), an end user (or other entity or component) may verify whether a computing device has ever booted an untrusted image (or performed any other action that is associated with booting untrusted images). Specifically, if the counter value 132 of secure counter 130 is anything but zero (or anything greater than the initialized value of secure counter 130), then the end user may know that the computing device in question has either previously booted an untrusted image or performed some other action that is associated with booting untrusted images.

In some examples, secure counter 130 may be included within and/or be implemented by tamper-logging component 120. In other examples, however, and as illustrated in FIG. 2, secure counter 130 may represent, or be included within, a standalone security component, such as security component 135 in FIG. 2. The term "security component," as used herein, generally refers to any type or form of software and/or hardware component (or combination of software and/or hardware components) capable of protecting, safeguarding, and/or authenticating the integrity, validity, and/or legitimacy of a secure counter's value. Examples of security components include, without limitation, software or hardware-based encryption schemes or mechanisms, cryptoprocessors (such as a Trusted Platform Module (TPM)), and the like.

In one example, security component 135 in FIG. 2 may represent a hardware-based cryptoprocessor. In this example, secure counter 130 may represent a monotonic counter maintained or implemented by security component 135. The term "monotonic counter," as used herein, generally refers to a counter whose value, once incremented, cannot be reverted to a previous one.

In some examples, security component 135 may, in addition to incorporating various software and/or hardware-based security measures, include various physical protection measures to provide evidence of any attempt to physically alter security component 135 (including, e.g., attempts to remove, replace, and/or otherwise physically modify security component 135). For example, security component 135 may include a tamper-evident seal (such as tamper-evident seal 105 in FIG. 2) that provides physical evidence of any attempt to physically alter security component 135. Examples of tamper-evident seals include, without limitation, any type or form of cover or enclosure that must be physically removed, broken, or otherwise physically modified in order to physically alter the sealed component. In some examples, tamper-evident seal 105 may only seal and provide physical evidence of attempts to physically alter security component 135. In other examples, and as illustrated in FIG. 2, tamper-evident seal 105 may seal (and provide physical evidence of attempts to physically alter)

other components of apparatus 100, such as storage device 110 and/or tamper-logging component 120.

Security component 135 may protect, safeguard, and/or authenticate the integrity, validity, and/or legitimacy of the counter value 132 of secure counter 130 in a variety of ways. In one example, security component 135 may authenticate the counter value 132 of secure counter 130 by signing the same using a private cryptographic key, such as private key 134. The terms "private cryptographic key" and "private key," as used herein, generally refer to the non-public half of an asymmetric key pair that may be used to digitally sign objects. In some examples, a private key (such as an Attestation Identity Key (AIK) or other private key utilized by a TPM) may be used to digitally sign an object (such as the counter value 132 of secure counter 130), and the digital signature may later be authenticated using a public key that corresponds to the private key. In these examples, authentication of the digital signature may verify both that the object was signed by the private key and that the object has not been tampered with.

For example, and as illustrated in FIG. 3A, security component 135 may, in response to receiving a request or query for the present value of secure counter 130 from tamper-logging component 120 (and/or any other component), digitally sign the counter value 132 of secure counter 130 using private key 134, resulting in signed value 332. In this example, upon receiving signed value 332 from security component 135, tamper-logging component 120 (and/or any other component) may independently verify the authenticity of signed value 332 using a public key that corresponds to private key 134. For example, and as illustrated in FIG. 3B, tamper-logging component 120 may verify signed value 332 by decrypting the same using public key 334, resulting in counter value 132. In this example, tamper-logging component 120 (and/or any other component) may, by successfully decrypting signed value 332, verify both (1) that the private key utilized by security component 135 (i.e., private key 134) is authentic (since tamper-logging component 120 was able to successfully decrypt signed value 332 using the corresponding public key 334) and (2) that the counter value 132 of secure counter 130 has not been tampered with.

Since some security components (such as TPMs) offer reset procedures that allow end users or other components to reset these security components to an "un-owned" state (which may, in turn, erase one or more of the encryption keys utilized by the security components and/or reset one or more of the secure counters maintained by the security components), in some examples tamper-logging component 120 may verify the legitimacy of signed value 332 by verifying that the private key used by security component 135 (e.g., private key 134) to sign the counter value 132 of secure counter 130 has not been changed, reset, or otherwise tampered with since leaving manufacturing.

In one example, tamper-logging component 120 may verify the integrity of private key 134 by querying a backend device (such as backend device 200 in FIG. 2), operated by a trusted third party (such as a manufacturer of apparatus 100 and/or security component 135), that maintains a database (e.g., key database 210) that contains the public keys for each device or apparatus supported by the trusted third party. In this example, the trusted third party may, upon manufacturing apparatus 100 and/or security component 135, initialize security component 135, which may in turn generate private key 134. The trusted third party may then record the public key that corresponds to private key 134 (e.g., public key 334), along with information that uniquely identifies the apparatus or component to which the public key corresponds (such as a serial number for apparatus 100 and/or security component 135), in key database 210.

In this example, tamper-logging component 120 may later verify that the private key 134 used by security component 135 of apparatus 100 has not been changed or reset since leaving manufacturing by (1) querying backend device 200 for the public key 334 that is uniquely associated with apparatus 100 and/or security component 135 (by sending, e.g., identifying information for apparatus 100 and/or security component 135, such as a hash of a serial number) and then (2) attempting to decrypt the signed value 332 provided by security component 135 using the public key 334 provided by backend device 200. If tamper-logging component 120 is able to successfully decrypt the signed value 332 provided by security component 135 using the public key 334 provided by backend device 200, then tamper-logging component 120 may assume that the private key 134 used by security component 135 has not been changed or reset since leaving manufacturing, and may in turn trust the signed value 332 of secure counter 130.

If, however, tamper-logging component 135 is unable to successfully decrypt the signed value 332 provided by security component 135 using the public key 334 provided by backend device 200, then tamper-logging component 120 may assume that the private key 134 used by security component 135 has been changed or reset. As such, tamper-logging component 120 may assume that the signed value 332 provided by security component 135 is untrustworthy, and that apparatus 100 has either previously booted an untrusted image or performed some other action that is associated with booting untrusted images (such as clearing or resetting security component 135).

In another example, tamper-logging component 120 (or any other component) may verify the integrity or legitimacy of any public keys in its possession by querying backend device 200. For example, tamper-logging component 120 may wish to verify the integrity or legitimacy of a public key 334 in its possession. In this example, tamper-logging component 120 may send a query to backend device that contains (1) information that uniquely identifies apparatus 100 and/or security component 135 (such as a hash of a serial number for apparatus 100 and/or security component 135) and (2) a copy of the public key 334 that it possesses. Backend device 200 may then return a response (e.g., "LEGITIMATE/ILLEGITIMATE" or "TRUE/FALSE") that indicates whether public key 334 matches the public key that was originally associated with apparatus 100 and/or security component 135 during manufacturing and recorded in key database 210.

In some cases, tamper-logging component 120 may allow a detected action to be performed regardless of whether tamper-logging component 120 is able to successfully log the same. In other examples, however, tamper-logging component 120 may only allow a detected action to be performed if tamper-logging component 120 is able successfully log the detected action (by, e.g., successfully incrementing secure counter 130). If, for example, tamper-logging component 120 is unable to securely log an attempt to boot an untrusted image (due to, e.g., a software or hardware failure or an attempt by a malicious component to block the same), then tamper-logging component 120 may prevent the boot attempt. By doing so, tamper-logging component 120 may ensure that the counter value 132 of secure counter 130 accurately reflects the number of times actions associated with booting untrusted images have occurred.

In some examples, tamper-logging component 120 may provide an application programming interface (API) that enables other components or modules to securely obtain and/or read the present of secure counter 130. For example, tamper-logging component 120 may provide or otherwise implement an API that operating systems (e.g., JUNIPER's JUNOS OS or COMMAND LINE INTERFACE), application software, platforms (e.g., JUNIPER's JUNOS SPACE), or other components or modules may use to obtain and/or read the signed value 332 of secure counter 130. This API may, in turn, enable these operating systems, application software, platforms, and/or other components or modules to independently verify whether their associated computing devices have ever performed any actions that are associated with booting untrusted images.

In some examples, tamper-logging component 120 may, in addition to securely logging the occurrence of an action that is associated with booting untrusted images, generate and/or securely store additional information that uniquely identifies the detected action and/or the target of the detected action (such as an untrusted image that was loaded or booted). In some examples, tamper-logging component 120 may store this additional information in the form of a change certificate, such as change certificate 114 in FIG. 2. The term "change certificate," as used herein, generally refers to any type or form of electronic object capable of uniquely and/or securely identifying a computing action and/or the target of a computing action.

Tamper-logging component 120 may create and/or securely store change certificates in a variety of ways. For example, and as illustrated in FIG. 4A, in response to detecting (and logging) an attempt to boot an untrusted image (such as image 112 in FIG. 2), tamper-logging component 120 may create change certificate 114 by (1) generating a hash of image 112 (resulting in image hash 410) and then (2) digitally signing, or instructing security component 135 to digitally sign (using, e.g., private key 134), the counter value 132 of secure counter 130 and/or image hash 410, resulting in change certificate 114. In this example, change certificate may uniquely identify both (1) the untrusted image that was booted (in this case, image 112) and (2) the counter value 132 of secure counter 130 after booting the untrusted image.

Change certificate 114 may include a variety of information, in both signed and unsigned formats. For example, in one embodiment change certificate 114 may include a digitally signed version of both image hash 410 and counter value 132. In other embodiments, however, change certificate 114 may include unsigned versions of image hash 410 and/or counter value 132. Change certificate 114 may also be created and/or signed by a variety of components, including tamper-logging component 120 and/or security component 135. In addition, change certificate 114 may be stored in a variety of formats and locations, including within the boot partition of a boot device (such as storage device 110).

In some examples, tamper-logging component 120 may use change certificate to determine whether a detected action involves a previously logged action and/or image. For example, in some embodiments tamper-logging component 120 may, prior to incrementing secure counter 130 in response to detecting an attempt to boot an untrusted image, determine whether the detected attempt represents another attempt to boot the same untrusted image that was previously detected, securely logged, and recorded in change certificate 114.

Specifically, and as illustrated in FIG. 4B, tamper-logging component 120 may, in response to detecting an attempt to boot an untrusted image, determine (and/or instruct security component 135 to determine) whether the untrusted image has already been detected, securely logged, and recorded by decrypting change certificate 114 using public key 334, resulting in image hash 410 and counter value 132. In this example, if the hash of the untrusted image in question matches image hash 410, then tamper-logging component 120 may assume that the untrusted image in question has already been detected, securely logged, and recorded, and may refrain from incrementing (or refrain from instructing security component 135 to increment) secure counter 130. In contrast, if the hash of the untrusted image in question does not match image hash 410, then tamper-logging component 120 may assume that the untrusted image in question represents a new untrusted image, and may increment (or instruct security component 135 to increment) secure counter 130. In these examples, by refraining from incrementing secure counter 130 during subsequent boots of the same untrusted image, tamper-logging component 120 may ensure that the counter value 132 of secure counter 130 accurately reflects the number of times unique actions associated with booting untrusted images have occurred.

Figure 5:
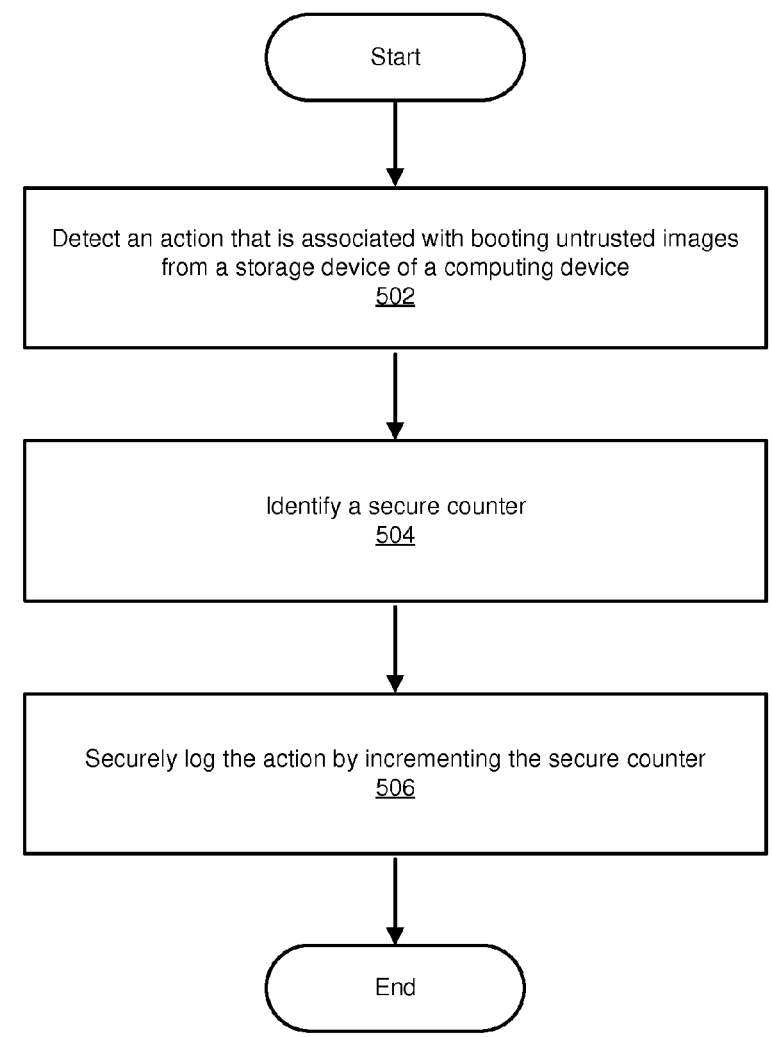
FIG. 5 is a flow diagram of an exemplary method for securely logging boot-tampering actions.

FIG. 5 is a flow diagram of an exemplary method for securely logging boot-tampering actions. The steps shown in FIG. 5 may be performed by any suitable computer-executable code, module, component, device, and/or system. In some embodiments, the steps shown in FIG. 5 may be performed by one or more of the components illustrated in FIGS. 1 and 2 (including, for example, tamper-logging component 120 and/or security component 135) and/or computing system 600 in FIG. 6.

As illustrated in FIG. 5, at step 502 the systems described herein may detect an action that is associated with booting untrusted images from a storage device of a computing device. For example, tamper-logging component 120 from FIG. 1 may detect an attempt to boot an untrusted image (e.g., image 112) from storage device 110.

At step 504, the systems described herein may identify a secure counter that is capable of securely logging the action detected in step 502. For example, tamper-logging component 120 from FIG. 1 may identify secure counter 130 (which may, in some examples, and as detailed above, represent a portion of security component 135).

At step 506, the systems described herein may securely log the action detected in step 502 by incrementing the secure counter identified in step 504. For example, tamper-logging component 120 from FIG. 1 may securely log the detected attempt to boot the untrusted image by incrementing (or instructing security component 135 to increment) the counter value 132 of secure counter 130. Upon completion of step 506, the process flow of exemplary method 500 may terminate.

As detailed above, the present disclosure describes various apparatuses and methods for securely logging and accurately reflecting the state of security of computing devices that must comply with the restrictions of free or open-source software licenses. For example, by securely logging the occurrence of actions on a computing device that are associated with booting untrusted images (including, e.g., attempts to boot untrusted images and/or disable secure boot processes that prevent booting untrusted images), the apparatuses and methods described herein may securely record, and thus accurately reflect, the state of security of the computing device in question. This may in turn enable end users (or other entities or components) to verify the state of security of the computing device, including whether the computing device has ever booted an untrusted image or performed any other action that might compromise the state of security of the computing device.

Figure 6:
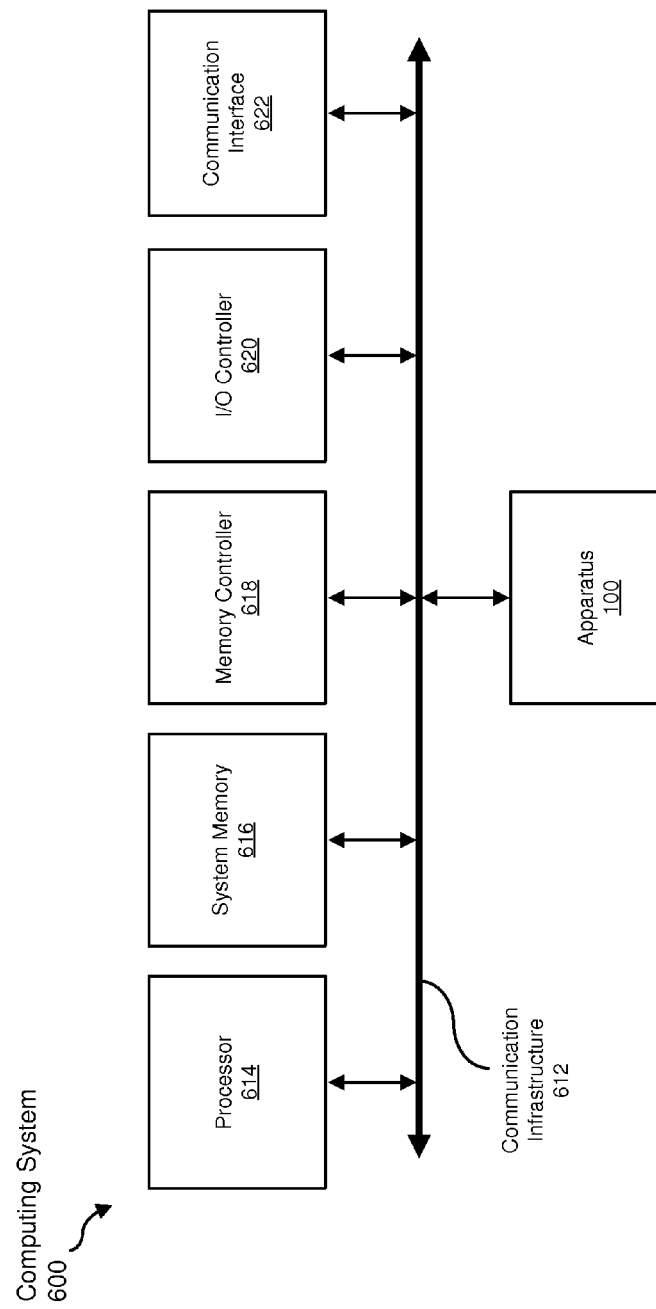
FIG. 6 is a block diagram of an exemplary computing system capable of implementing and/or being used in connection with one or more of the embodiments described and/or illustrated herein.

FIG. 6 is a block diagram of an exemplary computing system 600 capable of implementing and/or being used in connection with one or more of the embodiments described and/or illustrated herein. In some embodiments, all or a portion of computing system 600 may perform and/or be a means for performing, either alone or in combination with other elements, one or more of the steps described in connection with FIG. 5. All or a portion of computing system 600 may also perform, and/or be a means for performing and/or implementing, any other steps, methods, or processes described and/or illustrated herein. For example, in one embodiment computing system 600 may include apparatus 100 from FIG. 1. As detailed above, apparatus 100 may be configured to securely log boot-tampering actions.

Computing system 600 broadly represents any type or form of electrical load, including a single or multi-processor computing device or system capable of executing computer-readable instructions. Examples of computing system 600 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 600 may be programmed, configured, and/or otherwise designed to comply with one or more networking protocols. According to certain embodiments, computing system 600 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 600 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 600 may include various network and/or computing components. For example, computing system 600 may include at least one processor 614 and a system memory 616. Processor 614 generally represents any type or form of processing unit capable of processing data or interpreting and executing instructions. For example, processor 614 may represent an application-specific integrated circuit (ASIC), a system on a chip (e.g., a network processor), a hardware accelerator, a general purpose processor, and/or any other suitable processing element.

Processor 614 may process data according to one or more of the networking protocols discussed above. For example, processor 614 may execute or implement a portion of a protocol stack, may process packets, may perform memory operations (e.g., queuing packets for later processing), may execute end-user applications, and/or may perform any other processing tasks.

System memory 616 generally represents any type or form of volatile or non-volatile storage device or medium capable of storing data and/or other computer-readable instructions. Examples of system memory 616 include, without limitation, RAM, ROM, flash memory, or any other suitable memory device. Although not required, in certain embodiments computing system 600 may include both a volatile memory unit (such as, for example, system memory 616) and a non-volatile storage device (such as, for example, storage device 110, as described in detail above). System memory 616 may be implemented as shared memory and/or distributed memory in a network device. Furthermore, system memory 616 may store packets and/or other information used in networking operations.

In certain embodiments, exemplary computing system 600 may also include one or more components or elements in addition to processor 614 and system memory 616. For example, as illustrated in FIG. 6, computing system 600 may include a memory controller 618, an input/output (I/O) controller 620, and a communication interface 622, each of which may be interconnected via communication infrastructure 612. Communication infrastructure 612 generally represents any type or form of infrastructure capable of facilitating communication between one or more components of a computing device. Examples of communication infrastructure 612 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 618 generally represents any type or form of device capable of handling memory or data or controlling communication between one or more components of computing system 600. For example, in certain embodiments memory controller 618 may control communication between processor 614, system memory 616, and I/O controller 620 via communication infrastructure 612. In some embodiments, memory controller 618 may include a Direct Memory Access (DMA) unit that may transfer data (e.g., packets) to or from a link adapter.

I/O controller 620 generally represents any type or form of device or module capable of coordinating and/or controlling the input and output functions of a computing device. For example, in certain embodiments I/O controller 620 may control or facilitate transfer of data between one or more elements of computing system 600, such as processor 614, system memory 616, and communication interface 622.

Communication interface 622 broadly represents any type or form of communication device or adapter capable of facilitating communication between exemplary computing system 600 and one or more additional devices. For example, in certain embodiments communication interface 622 may facilitate communication between computing system 600 and a private or public network including additional computing systems. Examples of communication interface 622 include, without limitation, a link adapter, a wired network interface (such as a network interface card), a wireless network interface (such as a wireless network interface card), and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 622 may also represent a host adapter configured to facilitate communication between computing system 600 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also enable computing system 600 to engage in distributed or remote computing. For example, communication interface 622 may receive instructions from a remote device or send instructions to a remote device for execution.

Many other devices or subsystems may be connected to computing system 600. Conversely, all of the components and devices illustrated in FIG. 6 need not be present to practice the embodiments described and/or illustrated herein. The devices and subsystems referenced above may also be interconnected in different ways from those shown in FIG. 6. Computing system 600 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 and/or computing system 600 in FIG. 6 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

In addition, one or more of the modules and/or components described herein may transform data, physical devices, and/or representations of physical devices from one form to another. For example, one or more of the modules and/or components recited herein may receive information that indicates that an action associated with booting untrusted images has occurred, transform that information into a secure log or record of the same, securely store the transformed data, and use the result of the transformation to verify the state of security of a computing device. Additionally or alternatively, one or more of the modules and/or components recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. An apparatus comprising:
a storage device; and
a tamper-logging component that:
includes a secure counter whose counter value represents the number of times that actions associated with booting untrusted images from the storage device have occurred;
detects an action that is associated with booting untrusted images from the storage device, wherein the action comprises booting an untrusted image from the storage device;
in response to detecting the action:
securely logs the action by incrementing the counter value of the secure counter;

creates and stores a change certificate that uniquely identifies both the untrusted image and the secure counter's present value; and detects a request from a user for the counter value of the secure counter;

in response to detecting the request, provides the counter value of the secure counter to the user to enable the user to verify that an action associated with booting untrusted images from the storage device has occurred; and refrains from incrementing the secure counter during subsequent boots of the untrusted image identified in the change certificate.

2. The apparatus of claim 1, wherein the action further comprises at least one of:

disabling a secure boot process that prevents booting untrusted images from the storage device;

booting an image from the storage device while the secure boot process is disabled;

loading an untrusted image onto the storage device; and failing the secure boot process due to booting the untrusted image from the storage device.

3. The apparatus of claim 2, wherein the untrusted image comprises at least one of:

an unsigned image; and an improperly signed image.

4. The apparatus of claim 1, further comprising a tamper-evident seal that physically indicates when at least one of the following has been physically altered:

the storage device; and the tamper-logging component.

5. The apparatus of claim 1, wherein the tamper-logging component comprises an application programming interface that provides the secure counter's present value to additional components.

6. The apparatus of claim 1, wherein, if the tamper-logging component is unable to increment the secure counter, the tamper-logging component prevents the detected action.

7. The apparatus of claim 1, wherein the tamper-logging component creates the change certificate by instructing a security component to sign at least one of:

a hash of the untrusted image; and the secure counter's present value.

8. The apparatus of claim 1, wherein the tamper-logging component verifies that the secure counter has not been tampered with by authenticating a signed version of the secure counter's present value using a public cryptographic key that corresponds to a private cryptographic key, the signed version of the secure counter's present value having been signed using the private cryptographic key.

9. The apparatus of claim 7, wherein the tamper-logging component:

decrypts the signed change certificate using a public key to create an image hash;

compares the image hash created by decrypting the signed change certificate with the hash of the untrusted image;

determines, based at least in part on the comparison, that the image hash does not match the hash of the untrusted image; and in response to determining that the image hash does not match the hash of the untrusted image, securely logs the action by incrementing the counter value of the secure counter.

10. The apparatus of claim 1, wherein the tamper-logging component enables the user to verify a state of security for a computing device by providing the counter value of the secure counter to the user.

11. A method comprising:

detecting, by a tamper-logging component of a computing device, an action that is associated with booting untrusted images from a storage device of the computing device, wherein the action comprises booting an untrusted image from the storage device;

in response to detecting the action:

identifying, by the tamper-logging component of the computing device, a secure counter that is included in the tamper-logging component and whose counter value represents the number of times that actions associated with booting untrusted images from the storage device have occurred;

securely logging the action by incrementing, by the tamper-logging component of the computing device, the counter value of the secure counter; and creating and storing a change certificate that uniquely identifies both the untrusted image and the secure counter's present value;

detecting, by the tamper-logging component of the computing device, a request from a user of the computing device for the counter value of the secure counter;

in response to detecting the request, providing the counter value of the secure counter to the user to enable the user to verify that an action associated with booting untrusted images from the storage device has occurred; and refraining from incrementing the secure counter during subsequent boots of the untrusted image identified in the change certificate.

12. The method of claim 11, wherein the action comprises at least one of:

disabling a secure boot process that prevents booting untrusted images from the storage device;

booting an image from the storage device while the secure boot process is disabled;

failure of the secure boot process due to booting an untrusted image from the storage device; and modification of a private cryptographic key utilized by a security component.

13. The method of claim 11, further comprising verifying that the secure counter has not been tampered with by authenticating a signed version of the secure counter's present value using a public cryptographic key that corresponds to a private cryptographic key, the signed version of the secure counter's present value having been signed using the private cryptographic key.

14. The method of claim 11, wherein securely logging the action comprises:

decrypting, using a public key, the change certificate to create an image hash;

comparing the image hash created by decrypting the change certificate with a hash of the untrusted image;

determining, based at least in part on the comparison, that the image hash does not match the hash of the untrusted image; and in response to determining that the image hash does not match the hash of the untrusted image, securely logging the action by incrementing the counter value of the secure counter.

15. The method of claim 11, wherein providing the counter value of the secure counter to the user comprises enabling the user to verify a state of security for the computing device based at least in part on the counter value of the secure counter.

16. A non-transitory computer-readable medium comprising one or more computer-executable instructions that, when executed by at least one processor of a computing device, cause the computing device to:

detect an action that is associated with booting untrusted images from a storage device of the computing device, wherein the action comprises booting an untrusted image from the storage device;

in response to detecting the action:
    identify a secure counter that is included in a tamper-logging component of the computing device and whose counter value represents the number of times that actions associated with booting untrusted images from the storage device have occurred;
    securely log the action by incrementing the counter value of the secure counter; and
    create and store a change certificate that uniquely identifies both the untrusted image and the secure counter's present value;

detect a request from a user of the computing device for the counter value of the secure counter;

in response to detecting the request, provide the counter value of the secure counter to the user to enable the user to verify that an action associated with booting untrusted images from the storage device has occurred; and refrain from incrementing the secure counter during subsequent boots of the untrusted image identified in the change certificate.

\* \* \* \* \*